Oct. 23, 1956         H. L. MOWBRAY         2,767,631
ROD WEEDER ATTACHMENT FOR AGRICULTURE IMPLEMENTS
Filed July 22, 1953.         2 Sheets-Sheet 1
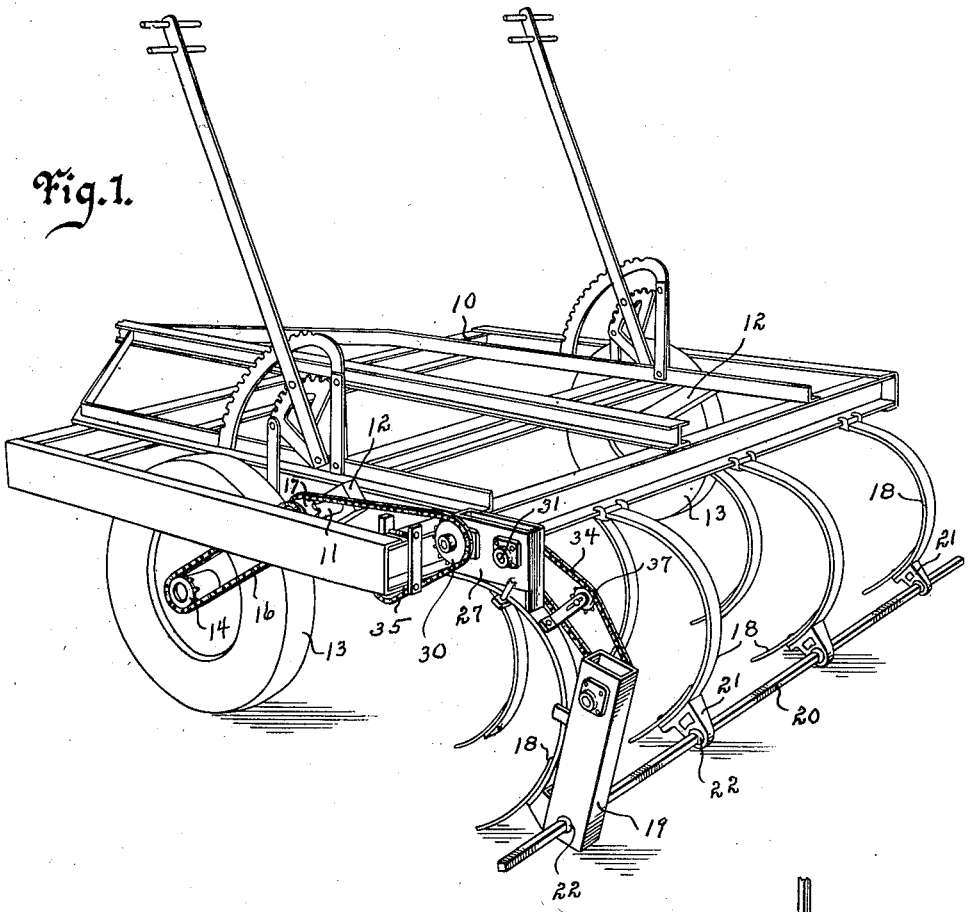
Inventor
Harry L. Mowbray
by Talbert Dick Adler
Attorneys
Witness
Edward P. Seeley

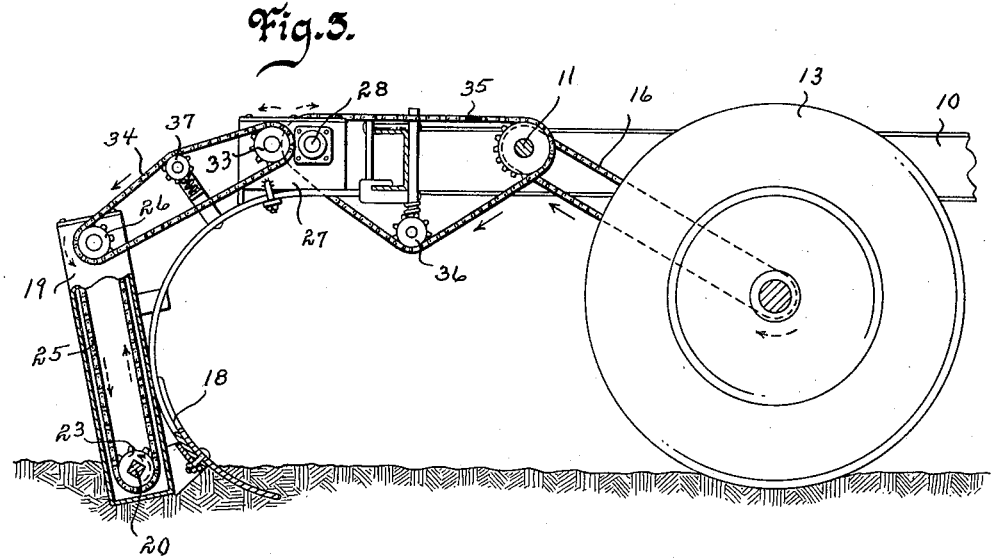
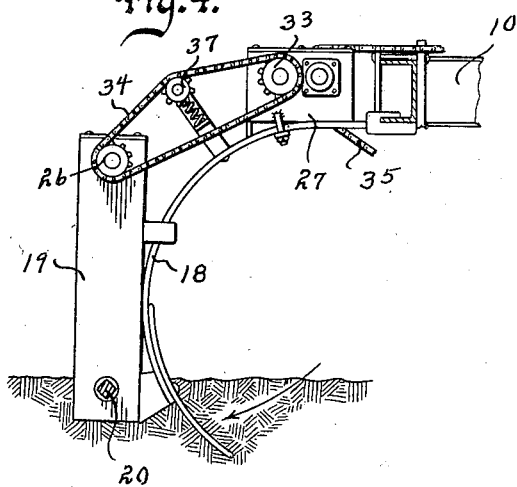
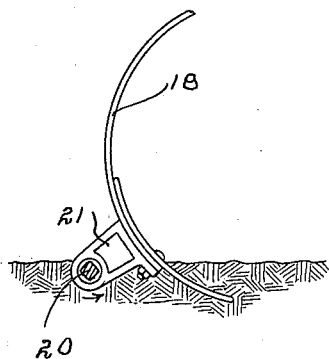

United States Patent Office 2,767,631
Patented Oct. 23, 1956

2,767,631

ROD WEEDER ATTACHMENT FOR AGRICULTURE IMPLEMENTS

Harry L. Mowbray, Medford, Okla.

Application July 22, 1953, Serial No. 369,572

3 Claims. (Cl. 97—42)

This invention relates to rotatable rod weeders and more particularly to their method of attachment and method of power driving.

The conserving of ground moisture is most necessary in many farming areas. This, of course, requires the destruction of non-productive vegetation such as weeds and like. Perhaps the most valuable tool for this purpose is the rod weeder which is an elongated horizontal rod, square in cross section and usually mounted for powered rotation to and back of a chisel plow. As is well known, chisel plows have a vertically adjustable frame, wheel supported, and with a plurality of shovel or plow portions secured to the frame and extending to the rear thereof. Such plows adequately condition the ground ahead of the rod weeder. However, without the rod weeder, many of the obnoxious weeds or undesirable vegetation are not killed, but merely transplanted, and continue to grow. By the use of a rod weeder, the weeds are brought to the surface and usually with the roots exposed and uppermost, in which condition they readily die.

While the above equipment gives excellent results, two problems arise, i. e., the power connection from the vehicle wheel to the frame, and the power connection from the frame to the rotatable weeder must be flexible, employing universal joints. Furthermore, the shafts must extend at an angle and the one leading from the frame to the weeder must penetrate the ground at a transverse angle to reach the rod weeder. This is not only a serious drag and loss of power, but the shaft that extends into the ground to the rod weeder, collects and winds up on itself, vegetation of every nature, thereby requiring constant cleaning. Furthermore, the lower universal joint must function below the earth's surface and rapidly wears out.

Therefore, the principal object of my invention is to provide a rod weeder attachment for plows that has no flexible shafts or universal joints for its power connections.

A further object of this invention is to provide a rod weeder for plows that is so power connected as to reduce drag to a minimum.

Still further objects of my invention are to provide a rod weeder attachment that is economical in manufacture and durable in use.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my weeder mounted on a chisel plow and with the gear box tops removed to better illustrate the same, Fig. 2 is a top plan view of the gear portion of my rod weeder, Fig. 3 is a side sectional view taken on line 3—3 of Fig. 2, Fig. 4 is a side view of my powered weeder and shows its position when considerable stress is being placed on the chisel plow unit to which it is mounted, and Fig. 5 is a side view of one of the other chisel plow units used to rotatably support the rod weeder.

In these drawings I have used the numeral 10 to designate the frame of a chisel plow. Such frames have stub axles 11 for hingedly supporting the wheel arms 12. These arms 12 extend forwardly and downwardly to rotatably support the wheels 13 respectively. On all such plows, a lever means is provided for lowering and raising the frame relative to the wheels. On at least one of the wheel axles I have mounted sprocket wheel 14 as shown in Fig. 1. The numeral 15 designates a sprocket wheel rotatably mounted on the stub axle 11 that supports the wheel having the sprocket wheel 14. The numeral 16 designates an endless chain embracing the sprocket wheels 14 and 15. The numeral 17 designates a second sprocket wheel on the shaft 11, further reference to which will be made later. Extending downwardly from the rear portion of the frame 10 are the usual chisel plow units 18. The numeral 19 designates an elongated rectangular gear housing secured by any suitable means on the back side of that chisel plow unit that is substantially back of the bull wheel 13 as shown in Fig. 2. It will be noted that the width of the gear box 19 is substantially that of the width of the chisel plow unit and that the gear box housing 19 extends downwardly to the back of the chisel plow so that when the chisel plow unit is in the ground as shown in Figs. 3 and 4, the lower end portion of the gear housing 19 will also be below the surface of the ground. By the gear box housing being of substantially the same width as the chisel plow unit and directly back of the same, it will not afford any material drag.

The numeral 20 designates the rod weeder per se which is an elongated rod substantially square in cross section. This member 20 is designed to rotatably extend through the lower portion of the gear housing 12 and through bearing members 21, which are detachably secured to the back lower end portions of a plurality of the chisel plow units 18 as shown in Fig. 1. At points where the rod 20 extends through or into the housing 19 and into or through the bearing members 21, the same may be rounded or if desired, may have round bearings 22 which I show in the drawings. The numeral 23 designates a sprocket wheel on the rod 20 and journaled in the lower portion of the housing 19. The numeral 24 designates a sprocket gear journaled in the upper portion of the housing 19. The numeral 25 designates an endless chain in the gear housing 19 and embracing the two sprocket wheels 23 and 24. The numeral 26 designates a sprocket wheel journaled on the upper outside of the gear box 19 and operatively connected to the sprocket wheel 24. The numeral 27 designates a substantially horizontal gear box detachably secured by any suitable means on the upper top side of the chisel plow unit to which the gear box 19 is also secured. The numeral 28 designates a shaft journaled in the forward portion of the gear box 27. The numeral 29 designates a spur gear secured on the shaft 28 and inside the gear box 27. The numeral 30 designates a sprocket wheel secured on the shaft 28 and outside of the gear box 27. The numeral 31 designates a second shaft journaled through and in the gear box 27. Rigidly secured on this shaft 31 and inside the gear box 27 is the spur gear 32, with its teeth in engagement with the teeth of the spur gear 29. The numeral 33 designates a sprocket wheel rigidly connected to the shaft 31 and outside the gear housing 27. The numeral 24 designates an endless chain embracing the sprocket wheels 26 and 33 as shown in Fig. 2. The numeral 35 designates an endless chain embracing the sprocket wheels 17 and 30. The numeral 36 designates a spring loaded idler sprocket wheel engaging the chain 35. The numeral 37 designates a spring loaded idler sprocket wheel engaging the endless chain 34.

The practical operation of my rod weeder is as follows:

My equipment may be easily and quickly placed on agricultural implements already in use or it can be manufactured on and sold with the ground conditioning unit.

The gear housing 19 must be rigidly secured to one of the plow elements 18 and the gear housing 27 may be also mounted on this unit or on the frame 10. Inasmuch as the units 18 have spring characteristics, the spring loaded idler 37 is necessary as the unit 18 flexes. This action is shown by comparing Fig. 3 with Fig. 4. If the gear box 27 is also of an element 18, the spring loaded idler 36 is needed. By placing the sprocket wheel 15 on the same shaft 11 that the wheel supporting arm 12 is mounted, the chain 16 may go directly from the wheel to the sprocket wheel 15 and this chain will continue to be of uniform tightness regardless of the lowering and raising of the frame 10 relative to the wheels. It is by this construction that I have eliminated undesirable flexible shafts and universal joints leading from the bull wheel 13. By placing the gear box 19 directly on and to the rear of one of the plows 18, power can be delivered downwardly to the rod weeder 20 directly and without interference in the pulling of the earth conditioner through the ground. Therefore, by this structure I have eliminated flexible shafts and universal joints connected to the rod weeder 20.

Furthermore, the gear mechanism is sealed inside the gear housing 19 and there is no wear from dust, grit or sand, such as found in flexible drive shafts and/or universal joints working below the ground surface. Furthermore, my entire power means is rotatably direct, thereby making my rod weeder operate with a great deal less power than weeders herebefore using flexible shafts and/or universal joints.

The purpose of the spur gears 29 and 32 is to reverse the direction of rotation so that the rod weeder 20 will rotate as shown by the arrow in Fig. 5. The gear box 19 and gear box 27 may contain a lubricant and be sealed as shown in Fig. 3.

When the vehicle is pulled over the ground, the pull wheel 13 will rotate the endless chain 16, which through sprocket wheels will rotate the chain 35. The chain 35 through the gears and gear box and sprocket wheels will rotate the chain 34. The chain 34 through the sprocket wheels will rotate the chain 35 which in turn will rotate the rod weeder 20.

Although I have described and illustrated my rod weeder as particularly adapted for use on chisel plows, it is obvious that it may be placed on other types of earth conditioning machines.

Some changes may be made in the construction and arrangement of my rod weeder attachment for agriculture implements without departing from the real spirit and purpose of my invention, and it is my intention to cover by my claims, any modified forms of structure or use of mechanical equivalents which may be reasonably included within their scope.

I claim:

1. In combination, an agricultural vehicle having a frame, wheels supporting said frame, a plurality of flexible earth engaging members depending from said frame, an elongated gear box secured to the back of one of said flexible members, said box being closed on the sides and bottom thereof, a rectangular rod journalled in the lower portion of said box and to the rear of some of the other of said members, a first sprocket wheel disposed in the bottom of said box and drivingly connected with said rod, a second sprocket wheel journalled in the upper portion of said box, an endless chain connecting said sprocket wheels, a third sprocket wheel mounted on the exterior of said box coaxially with said second sprocket wheel and drivingly connected thereto, a fourth sprocket wheel journalled on the upper top side of said one of said members, a second endless chain connecting said third and fourth sprocket wheels, an idler sprocket wheel, means for mounting said idler wheel on said one of said members and for biasing the latter wheel into engagement with said second chain, and upward deflection of the lower portion of said one of said members causing said third sprocket wheel to be moved toward said fourth sprocket wheel and simultaneously causing said idler wheel to be moved against said second chain to tension the latter.

2. The structure defined in claim 1 wherein means are drivingly associated with one of said frame supporting wheels and said fourth sprocket wheel for transferring power therebetween.

3. The structure defined in claim 2 wherein the means associated with one of the frame supporting wheels comprises sprocket wheels and an endless chain and means to tension the latter chain.

References Cited in the file of this patent

UNITED STATES PATENTS

| | | |
|---|---|---|
| 1,338,204 | Wolfe | Apr. 27, 1920 |
| 1,995,160 | Tuft | Mar. 19, 1935 |
| 2,148,370 | Edgington | Feb. 21, 1939 |
| 2,208,894 | Coburn | July 23, 1940 |
| 2,318,097 | Richmond | May 4, 1943 |
| 2,528,270 | Fundingsland | Oct. 31, 1950 |
| 2,596,270 | Miller et al. | May 13, 1952 |
| 2,664,803 | Ganzmann | Jan. 5, 1954 |